United States Patent
Tobari et al.

(10) Patent No.: US 7,560,896 B2
(45) Date of Patent: Jul. 14, 2009

(54) VECTOR CONTROL APPARATUS FOR PERMANENT MAGNET MOTOR

(75) Inventors: Kazuaki Tobari, Hitachiota (JP); Kentaro Ohi, Hitachi (JP); Yoshitaka Iwaji, Hitachinaka (JP)

(73) Assignees: Hitachi, Ltd., Tokyo (JP); Hitachi Car Engineering Co., Ltd., Ibaraki-ken (JP)

( * ) Notice: Subject to any disclaimer, the term of this patent is extended or adjusted under 35 U.S.C. 154(b) by 0 days.

(21) Appl. No.: 11/679,271

(22) Filed: Feb. 27, 2007

(65) Prior Publication Data

US 2007/0216342 A1  Sep. 20, 2007

(30) Foreign Application Priority Data

Mar. 15, 2006  (JP) .............................. 2006-070142

(51) Int. Cl.
*H02P 27/04* (2006.01)
(52) U.S. Cl. .................... 318/807; 318/767; 318/727
(58) Field of Classification Search ............... 318/432, 318/400.02, 700, 38, 807, 767, 727
See application file for complete search history.

(56) References Cited

U.S. PATENT DOCUMENTS

| | | | |
|---|---|---|---|
| 6,198,256 B1 * | 3/2001 | Miyazaki et al. ............. | 322/16 |
| 6,456,030 B1 * | 9/2002 | Masaki et al. ............... | 318/700 |
| 6,677,724 B1 * | 1/2004 | Kim et al. ................... | 318/700 |
| 6,700,400 B2 * | 3/2004 | Atarashi ..................... | 324/772 |
| 6,707,265 B2 * | 3/2004 | Imai et al. ............... | 318/400.32 |
| 6,984,957 B2 * | 1/2006 | Tajima et al. ........... | 318/400.02 |
| 7,039,542 B2 * | 5/2006 | Fujii et al. .................. | 702/115 |

FOREIGN PATENT DOCUMENTS

| | | |
|---|---|---|
| JP | 08-182398 | 7/1996 |
| JP | 2002-095300 | 3/2002 |

\* cited by examiner

*Primary Examiner*—Bentsu Ro
*Assistant Examiner*—David S Luo
(74) *Attorney, Agent, or Firm*—Antonelli, Terry, Stout & Kraus, LLP.

(57) ABSTRACT

A vector control apparatus for a permanent magnet motor operated in the region of weak magnet field, wherein when the output voltages of the power converter saturate, the phase error command value represented by the difference between the angular position of the reference axis for control and the angular position of the motor magnetic flux axis is generated on the basis of the difference between the q-axis current command value and the detected value of the q-axis current, and the command values for the output voltages of the power converter are corrected by using the phase error command value, whereby a highly responsive torque control with high precision can be achieved.

14 Claims, 9 Drawing Sheets

US 7,560,896 B2

VECTOR CONTROL APPARATUS FOR PERMANENT MAGNET MOTOR

BACKGROUND OF THE INVENTION

This invention relates to a vector control method for a permanent magnet motor operated in the region of weak magnetic field.

A conventional example of the vector control for a permanent magnet motor operated in the region of weak magnetic field is disclosed in the Japanese patent document, JP-A-08-182398, wherein the d-axis current command value is tabulated and the control of the d- and q-axis currents is performed on the basis of the P-operation (proportional operation). Another conventional example is disclosed in the Japanese patent document, JP-2002-95300, wherein the motor terminal voltage is derived from the control section for the d- and q-axis currents and the d-axis current command value is obtained through the PI (proportional and integrating) operation on the basis of the difference between the terminal voltage and the terminal voltage command value.

SUMMARY OF THE INVENTION

According to JP-A-08-182398, however, since the current control depends on the proportional calculation (P-operation), the current value specified by the current command value cannot be obtained so that the torque precision is degraded. JP-2002-95300 also has a drawback that the torque response tends to be degraded since the generation of the d-axis current command is somewhat retarded.

The object of this invention is to provide a vector control apparatus for a permanent magnet motor operated in the region of weak magnetic field, wherein a highly responsive torque control with high precision can be achieved even in the region of weak magnetic field.

According to this invention, when the output voltage of the power converter is limited, the phase error command value is calculated as the angular difference between the angular position of the reference axis for control and the angular position of the motor axis, and the output voltage command value of the power converter is corrected by using the phase error command value, thereby achieving a highly responsive torque control with high precision.

According to this invention, there is provided a vector control apparatus for a permanent magnet motor operated in the region of weak magnetic field, wherein a highly responsive torque control with high precision can be achieved even in the region of weak magnetic field.

Other objects, features and advantages of the invention will become apparent from the following description of the embodiments of the invention taken in conjunction with the accompanying drawings.

DESCRIPTION OF THE EMBODIMENTS

Now, embodiments of this invention will be described in detail with reference to the attached drawings.

First Embodiment

Figure 1:
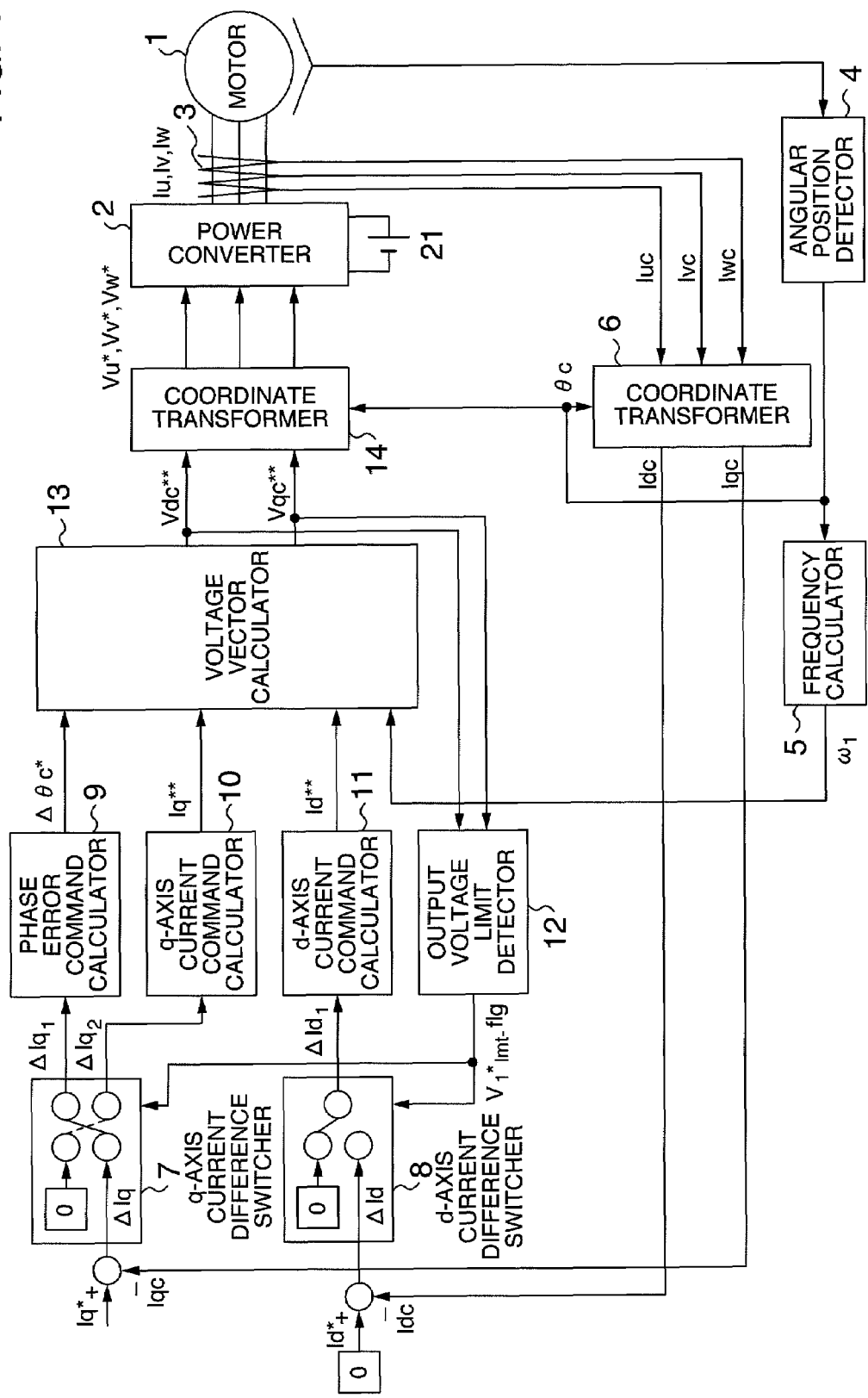
FIG. 1 schematically shows the overall structure of a vector control apparatus for a permanent magnet motor operated in the region of weak magnetic field, as a first embodiment of this invention.

FIG. 1 schematically shows the overall structure of a vector control apparatus for a permanent magnet motor operated in the region of weak magnetic field, as a first embodiment of this invention. In FIG. 1, reference numeral 1 indicates a permanent magnet motor; 2 a power converter for generating voltages proportional respectively to three-phase AC voltage command values Vu*, Vv* and Vw*; 21 a DC power source; 3 a current detector for detecting three-phase AC currents Iu, Iv and Iw; 4 an angular position detector using a resolver or an encoder, for detecting the angular position θ of the rotor shaft of the motor; 5 a frequency calculator for calculating the frequency value $\omega_1$ from the detected angular position θc; 6 a coordinate transformer for generating the detected current values Idc and Iqc for the d- and q-axes on the basis of the detected values Iuc, Ivc and Iwc of the three-phase AC currents Iu, Iv and Iw and the detected angular position θc; 7 a q-axis current difference switcher for selectively delivering to both a phase error command calculator 9 and a q-axis current command calculator 10, the value of "zero" or the difference ΔIq between the q-axis current command value and the detected current value, in response to the output voltage limiting flag $V_1^*{}_{lmt\_flg}$; 8 a d-axis current difference switcher for selectively delivering to a d-axis current command calculator 11, the value of "zero" or the difference ΔId between the d-axis current command value and the detected current value, in response to the output voltage limiting flag $V_1^*{}_{lmt\_flg}$; 9 a phase error command calculator for generating the phase error command value Δθc* from the first output value $\Delta Iq_1$ of the q-axis current difference switcher 7; 10 a q-axis current command calculator for generating the second q-axis current command Iq from the second output value $\Delta Iq_2$ of the q-axis current difference switcher 7; 11 a d-axis current command calculator for generating the second d-axis current command Id from the output value $\Delta Id_1$ of the d-axis current difference switcher 8; 12 an output voltage limit detector for calculating the output voltage value $V_1^*$ of the power converter 2 from the voltage command values Vdc and Vqc and for setting the output voltage limiting flag $V_1^*{}_{lmt\_flg}$ determined depending on the DC voltage value of the power converter 2 at "0" or "1" according as the output voltage value $V_1^*$ is smaller than the voltage limiting value $V_{1\ max}^*$ or the value $V_1^*$ has reached the voltage limiting value $V_{1\ max}^*$; 13 a voltage vector calculator for calculating the voltage command values Vdc and Vqc on the basis of the electric constants of the motor 1, the second current command values Id and Iq, the calculated frequency $\omega_1$ and the phase error command value $\Delta\theta c^*$; and 14 a coordinate transformer for generating the three-phase AC voltage command values Vu*, Vv* and Vw* from the voltage command values Vdc and Vqc and the detected angular position $\theta$.

The fundamental operations for voltage and phase controls in a vector control system using a phase error command calculator 9 characteristic of this invention will first be described.

In voltage control, the output voltage limit detector 12 shown in FIG. 1 calculates the output voltage value $V_1^*$ according to the following expression (1) by using the d- and q-axis voltage command values Vdc and Vqc.

$$V_1^* = \sqrt{Vdc^{2} + Vqc^{2}} \quad (1)$$

Further, the output voltage limiting flag $V_{1\ lmt\_flg}^*$ is generated according to the following expression (2) by using the output voltage value $V_1^*$ and the voltage limiting value $V_{1\ max}^*$.

$$\begin{pmatrix} V_1^* \max > V_1^* : V_{1^*lmt\_flg} = 0 \\ V_1^* \max \le V_1^* : V_{1^*lmt\_flg} = 1 \end{pmatrix} \quad (2)$$

To begin with, when the output voltage limiting flag $V_{1\ lmt\_flg}^*$ is "0", the q-axis current difference switcher 7 selects the signal $\Delta Iq_1$ supplied to the phase error command calculator 9 and the signal $\Delta Iq_2$ supplied to the q-axis current command calculator 10 according to the following expression (3).

$$\begin{pmatrix} \Delta Iq_1 = 0 \\ \Delta Iq_2 = \Delta Iq \end{pmatrix} \quad (3)$$

On the other hand, when the output voltage limiting flag $V_{1\ lmt\_flg}^*$ is "1", the signals $\Delta Iq_1$ and $\Delta Iq_2$ are selected according to the following expression (4).

$$\begin{pmatrix} \Delta Iq_1 = \Delta Iq \\ \Delta Iq_2 = 0 \end{pmatrix} \quad (4)$$

Then, when the output voltage limiting flag $V_{1\ lmt\_flg}^*$ is "0", the d-axis current difference switcher 8 delivers the signal $\Delta Id_1$ to the d-axis current command calculator 11, $\Delta Iq_1$ being equal to the d-axis current difference $\Delta Id$ (=Id*−Idc), while when the output voltage limiting flag $V_{1\ lmt\_flg}^*$ is "1", the signal $\Delta Id_1$ becomes equal to "0".

The voltage vector calculator 13 calculates the intermediate voltage command values Vdc* and Vqc* according to the following expression (5) by using the second d- and q-axis current command values Id and Iq, the electric constants of the motor and the calculated frequency $\omega_1$.

$$\begin{pmatrix} Vdc^* \\ Vqc^* \end{pmatrix} = \begin{pmatrix} R^* & -\omega_1 \cdot Lq^* \\ +\omega_1 \cdot Ld^* & R^* \end{pmatrix} \cdot \begin{pmatrix} Id^{} \\ Iq^{} \end{pmatrix} + \begin{pmatrix} 0 \\ \omega_1 \cdot Ke^* \end{pmatrix}, \quad (5)$$

where R* indicates the preset resistance value of the resistor, Ke* the preset value of the induced voltage constant, Ld* the preset value of the d-axis inductance, and Lq* the preset value of the q-axis inductance.

Further, the updated voltage command values Vdc and Vqc are calculated according to the following expression (6) by using the above expression (5) and the phase error command value $\Delta\theta c^*$. Consequently, the voltage output of the power converter 2 can be controlled.

$$\begin{pmatrix} Vdc^{} \\ Vqc^{} \end{pmatrix} = \begin{pmatrix} Vdc^* \\ Vqc^* \end{pmatrix} \cdot \begin{pmatrix} \cos\Delta\theta c^* & -\sin\Delta\theta c^* \\ \sin\Delta\theta c^* & \cos\Delta\theta c^* \end{pmatrix} \quad (6)$$

In phase control, the angular position detector 4 such as a resolver or an encoder detects the angular position $\theta$ of the motor shaft so as to obtain the detected angular position $\theta c$.

The frequency calculator 5 calculates the frequency value $\omega_1$ from the detected angular position $\theta c$ according to the following expression (7).

$$\omega_1 = \frac{d}{dt} \cdot \theta c \quad (7)$$

The foregoing is the fundamental operations of the voltage and phase controls.

Now, description will be made of the functional effect achieved by the phase error command calculator 9 which is characteristic of this invention.

Figure 2:
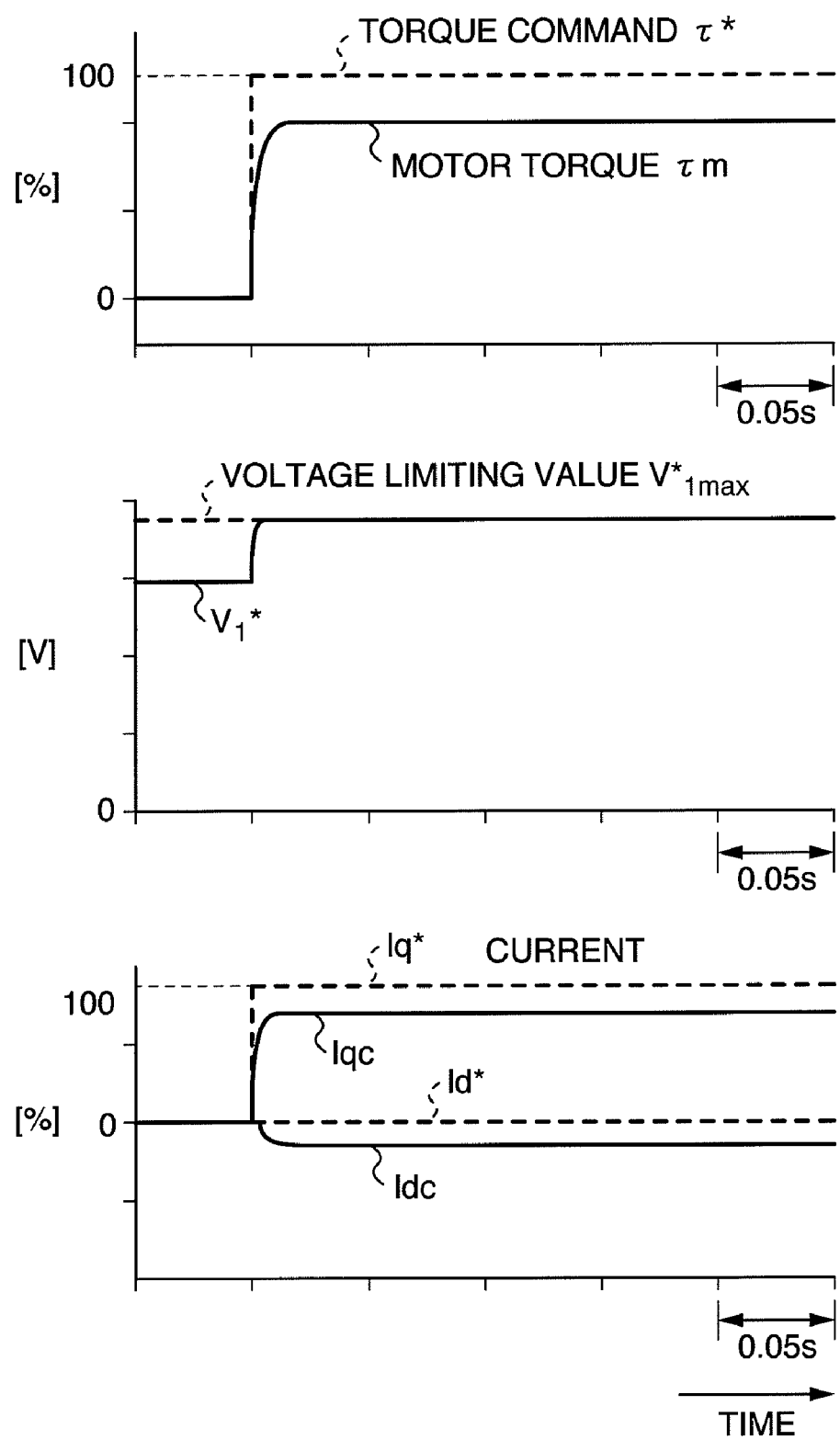
FIG. 2 graphically illustrates the control characteristics of the vector control apparatus as shown in FIG. 1, which lacks the phase error command calculator 9.

FIG. 2 graphically shows the "torque command step characteristics in the high speed region" when the phase error command value $\Delta\theta c^*$ is set to "0" in the control apparatus shown in FIG. 1, that is, without the weak field control.

Without the weak field control, the detected values Idc and Iqc of the d- and q-axis currents cannot follow up the first current command values Id* and Iq*, respectively, so that the generated motor torque $\tau_m$ does not follow up the torque command value $\tau^*$.

Figure 3:
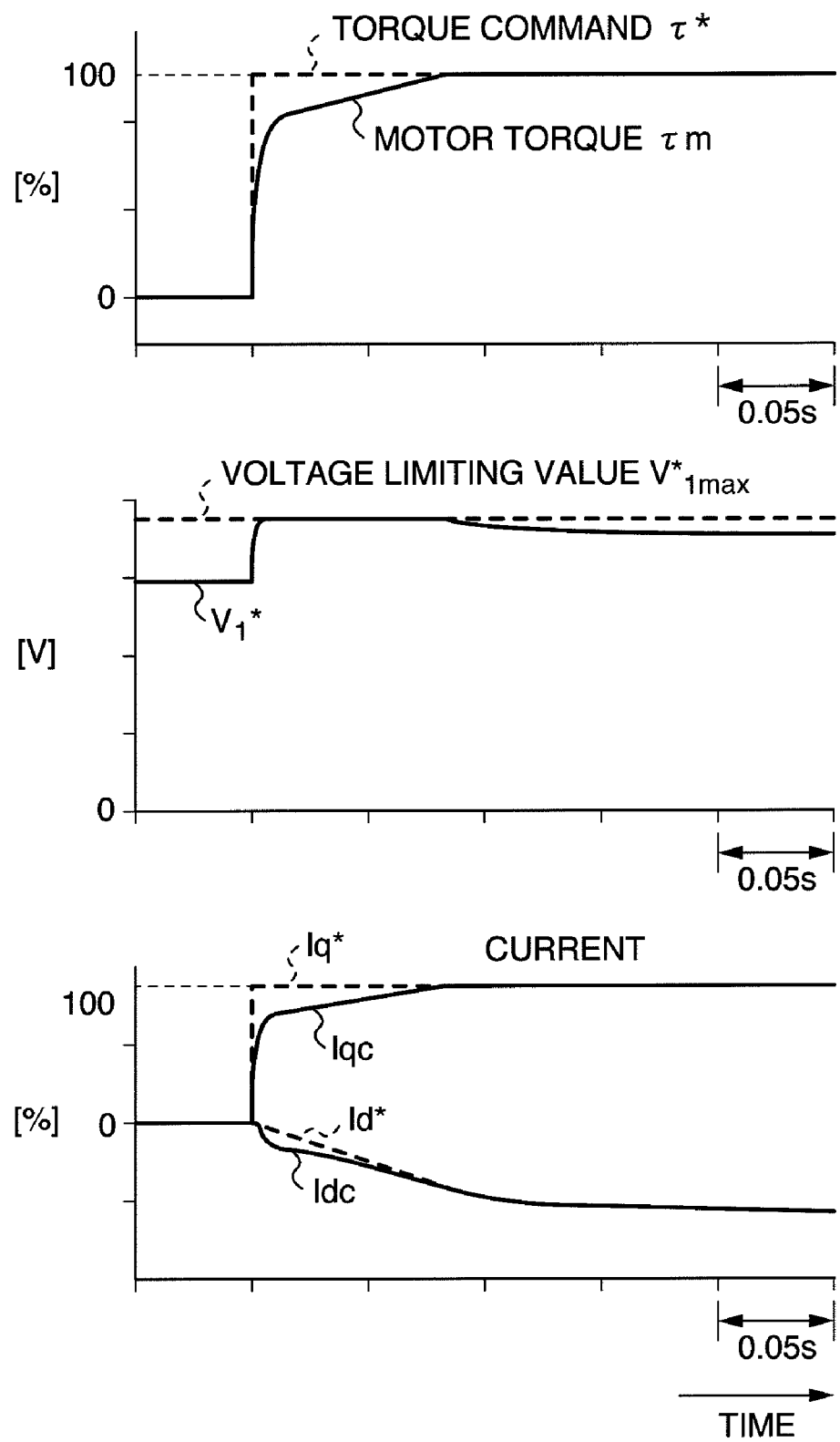
FIG. 3 graphically illustrates the control characteristics of a conventional vector control apparatus for a permanent magnet motor operated in the region of weak magnetic field.

FIG. 3 graphically shows the torque command step response characteristics of the method disclosed in the Japanese patent document, JP-2002-95300, wherein the d-axis current command value Id* is obtained by calculation so that the output voltage $V_1^*$ may not saturate.

In the steady state, the motor torque $\tau_m$ is equal to the command value $\tau^*$, but since a certain period of time is required before the d-axis current command value Id* has reached its steady state, it is seen that the motor torque remains insufficient for the period.

Accordingly, this invention does not employ the method of calculating the d-axis current command value Id*, but the method of calculating the phase error command value $\theta c^*$.

When the value of the output voltage $V_1^*$ is limited, the output voltage limiting flag $V_{1\ lmt\_flg}^*$ becomes "1". Then the phase error command calculator 9 proportionally integrates (PI-operates) the difference $\Delta Iq_1$ between the first q-axis current command value Iq* and the detected current value Iqc, and delivers the PI-operated value as its output representing the phase error command value $\theta c^*$.

At this time, the input signals $\Delta Iq_2$ and $\Delta Id_1$ supplied respectively to the d- and q-axis current command calculators 10 and 11 are both "0". As a result, the voltage vector calculator 13 does not perform the calculation of the output values Id and Iq, but holds the previous values.

Then, the voltage vector calculator 13 calculates the updated voltage command values Vdc and Vqc by using the phase error command value Δθc* and the intermediate voltage command values Vdc* and Vqc**.

In the region where the value of the output voltage $V_1^*$ is limited, the value of the output voltage $V_1^*$ is so controlled via the phase error represented by the difference between the angular position of the reference axis for control and the angular position of the motor magnetic flux axis, that the q-axis current command value may coincide with the value of the detected current. Consequently, the weak field control can be achieved while the d-axis current command value Id* is not generated, i.e. kept at zero.

Figure 4:
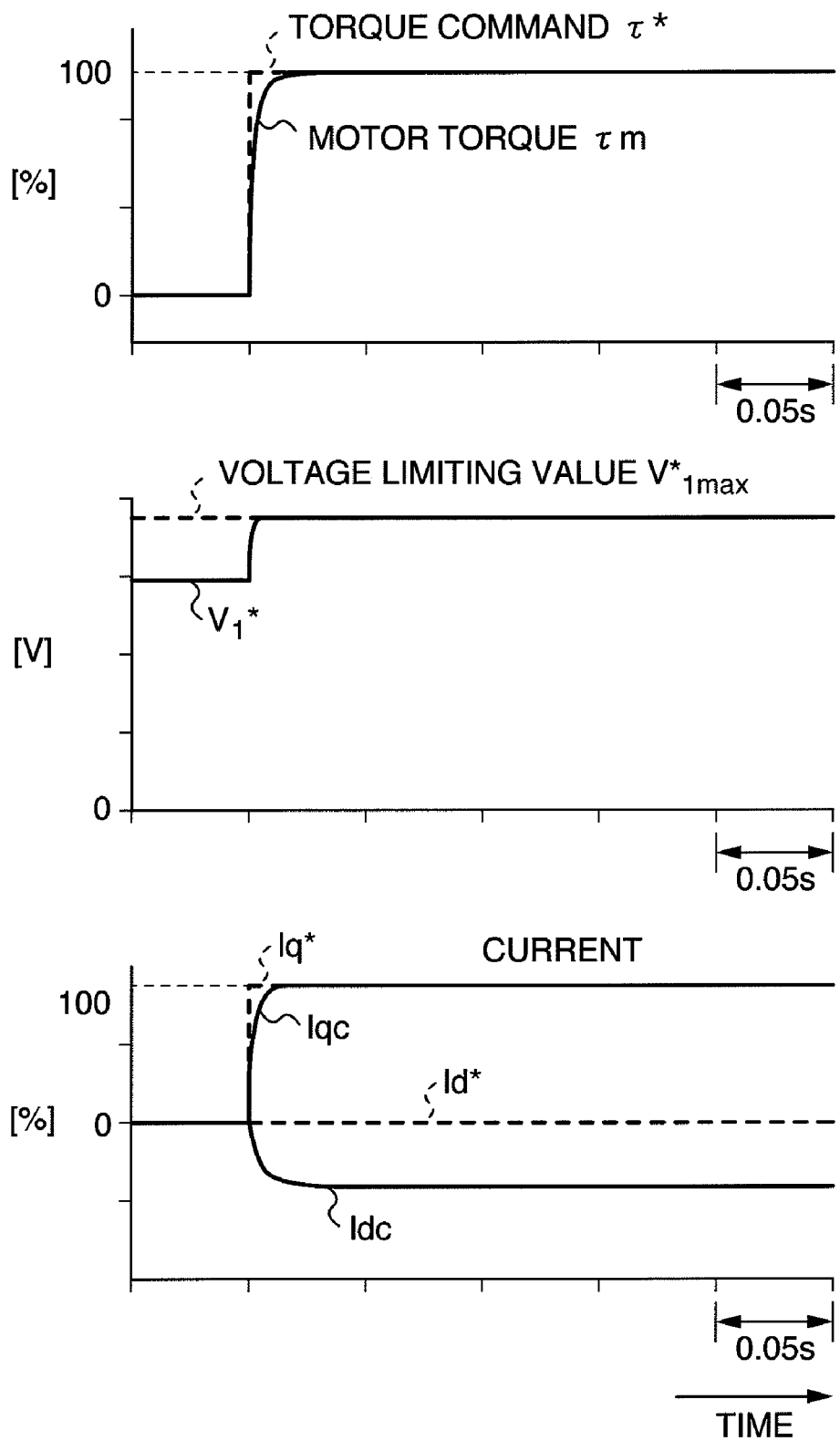
FIG. 4 graphically illustrates the control characteristics of the vector control apparatus as shown in FIG. 1, which incorporates the phase error command calculator 9 therein.

FIG. 4 graphically shows the characteristics obtained with the above mentioned method.

It is seen from FIG. 4 that a stable operation with highly responsive motor torque can be achieved while the d-axis current command value Id* is set at "zero".

Second Embodiment

Figure 5:
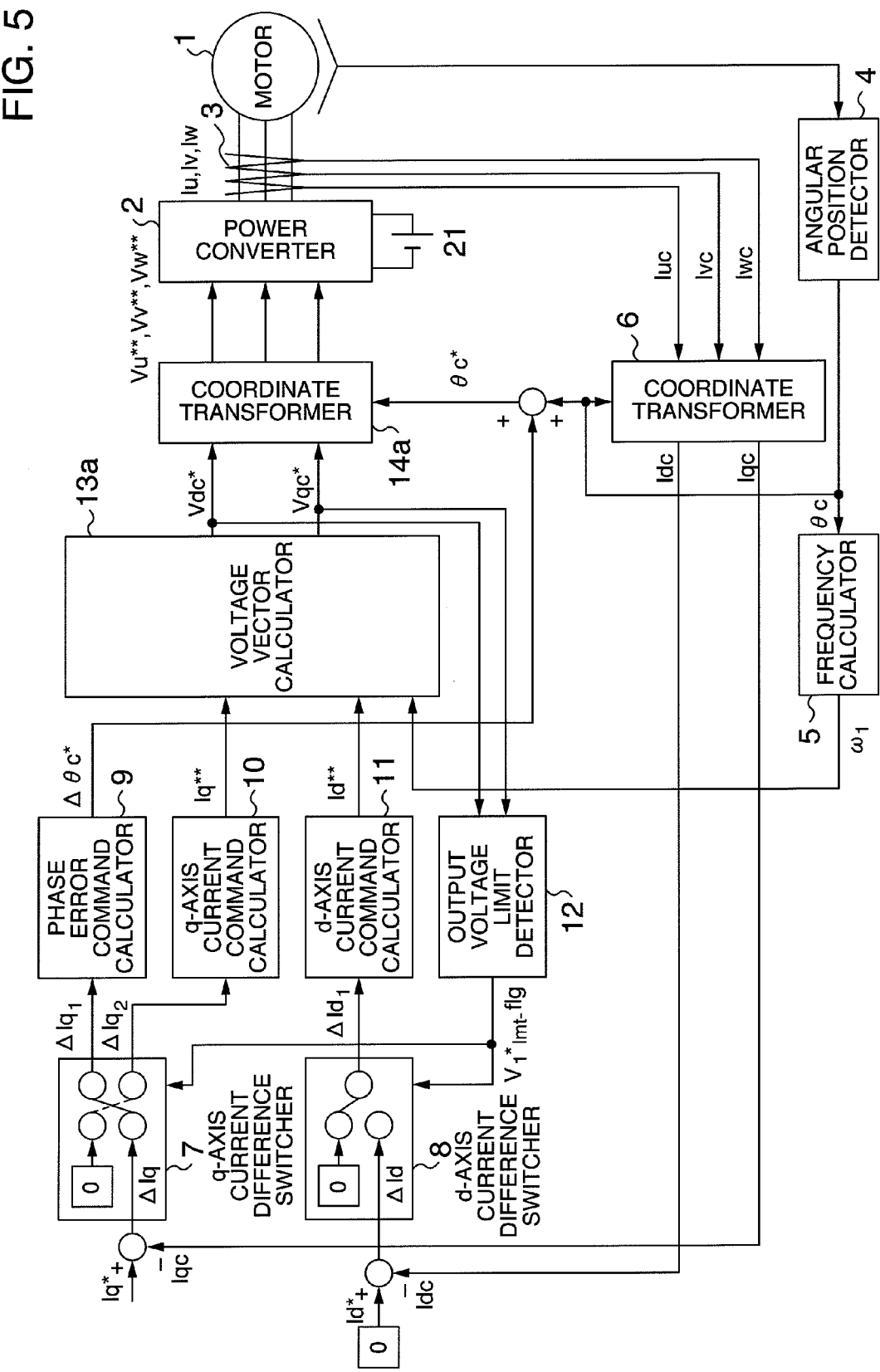
FIG. 5 schematically shows the overall structure of a vector control apparatus for a permanent magnet motor operated in the region of weak magnetic field, as a second embodiment of this invention.

FIG. 5 shows a second embodiment of this invention.

In the first embodiment of this invention described above, the voltage command values Vdc and Vqc are calculated in the system of rotating axes (d-q coordinate system). In the second embodiment of this invention, however, there is described a vector control apparatus for a permanent magnet motor operated in the region of weak magnetic field, wherein the three-phase voltage command values Vu, Vv and Vw** are corrected in the stator coordinate system (in terms of three-phase AC currents).

In FIG. 5, the components denoted by reference numerals 1 through 12 and 21 are identical with those corresponding components shown in FIG. 1.

A voltage vector calculator 13a calculates the intermediate voltage command values Vdc* and Vqc* according to the expression (5) given above by using the second d- and q-axis current command values Id and Iq, the motor constants and the calculated frequency 1.

A coordinate transformer 14a calculates the three-phase AC voltage command values Vu, Vv and Vw** according to the following expression (8) by using the value θc* which is the sum of the detected angular position θc and the phase error command value Δθc.

$$\begin{pmatrix} Vu^{} \\ Vv^{} \\ Vw^{**} \end{pmatrix} = \begin{pmatrix} 1 & 0 \\ -\frac{1}{2} & +\frac{\sqrt{3}}{2} \\ -\frac{1}{2} & -\frac{\sqrt{3}}{2} \end{pmatrix} \cdot \begin{pmatrix} \cos\theta c^* & -\sin\theta c^* \\ \sin\theta c^* & \cos\theta c^* \end{pmatrix} \cdot \begin{pmatrix} Vdc^* \\ Vqc^* \end{pmatrix} \quad (8)$$

Accordingly, a weak field control method can be achieved which is equivalent to the method wherein the voltage command values Vdc* and Vqc* are calculated in the system of rotating axes.

Third Embodiment

Figure 6:
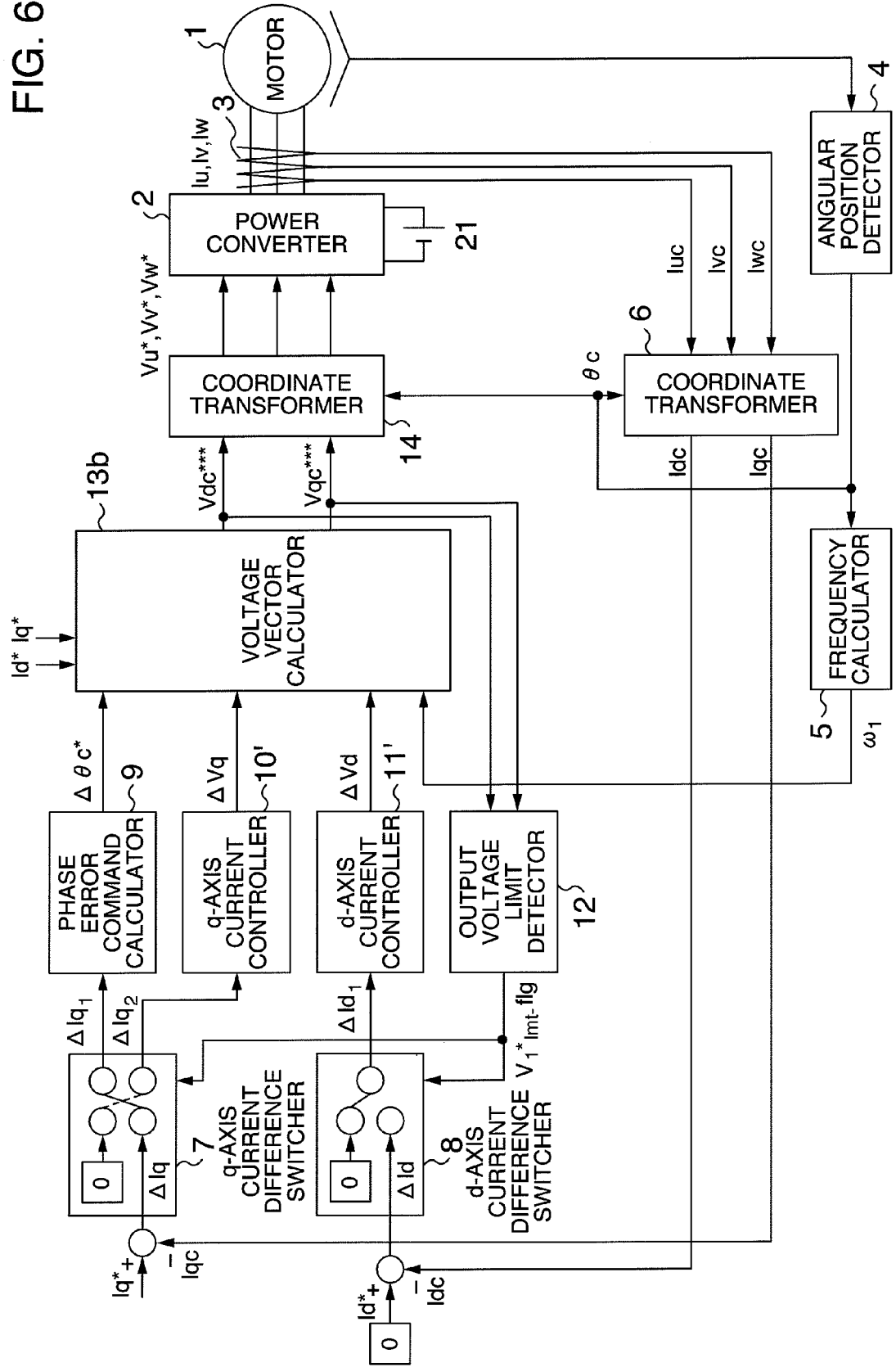
FIG. 6 schematically shows the overall structure of a vector control apparatus for a permanent magnet motor operated in the region of weak magnetic field, as a third embodiment of this invention.

FIG. 6 shows a third embodiment of this invention.

In this embodiment, the weak field control is applied to a vector control apparatus provided with d- and q-axis current controllers.

In FIG. 6, the components denoted by reference numerals 1 through 9, 12, 14 and 21 are identical with those corresponding components shown in FIG. 1.

Reference numeral 10' denotes a q-axis current controller to reduce the input signal $\Delta Iq_2$ to zero and reference numeral 11' indicates a d-axis current controller to reduce the signal $\Delta Id_1$ to zero. A voltage vector calculator 13b calculates the voltage command values Vdc* and Vqc* according to the following expression (9) by using the first d- and q-axis current command values Id* and Iq*, the outputs ΔVd and ΔVq of the d- and q-axis current controllers 11' and 10', the phase error command value Δθc* and the calculated frequency $\omega_1$.

$$\begin{pmatrix} Vdc^{*\prime} \\ Vqc^{*\prime} \end{pmatrix} = \begin{pmatrix} R^* & -\omega_1 \cdot Lq^* \\ +\omega_1 \cdot Ld^* & R^* \end{pmatrix} \cdot \begin{pmatrix} Id^* \\ Iq^* \end{pmatrix} + \begin{pmatrix} 0 \\ \omega_1 \cdot Ke^* \end{pmatrix} + \begin{pmatrix} \Delta Vd \\ \Delta Vq \end{pmatrix} \quad (9)$$

$$\begin{pmatrix} Vdc^{*} \\ Vqc^{*} \end{pmatrix} = \begin{pmatrix} Vdc^{*\prime} \\ Vqc^{*\prime} \end{pmatrix} \cdot \begin{pmatrix} \cos\Delta\theta c^* & -\sin\Delta\theta c^* \\ \sin\Delta\theta c^* & \cos\Delta\theta c^* \end{pmatrix}$$

This embodiment can achieve the same effect as achieved by the first embodiment described above.

Further, this embodiment employs the system as shown in FIG. 1, wherein the voltage command values are corrected in the d-q coordinate system by using the phase error command value Δθc*. The same effect can also be achieved according to the system as shown in FIG. 5, wherein the three-phase voltage command values are corrected.

Fourth Embodiment

Figure 7:
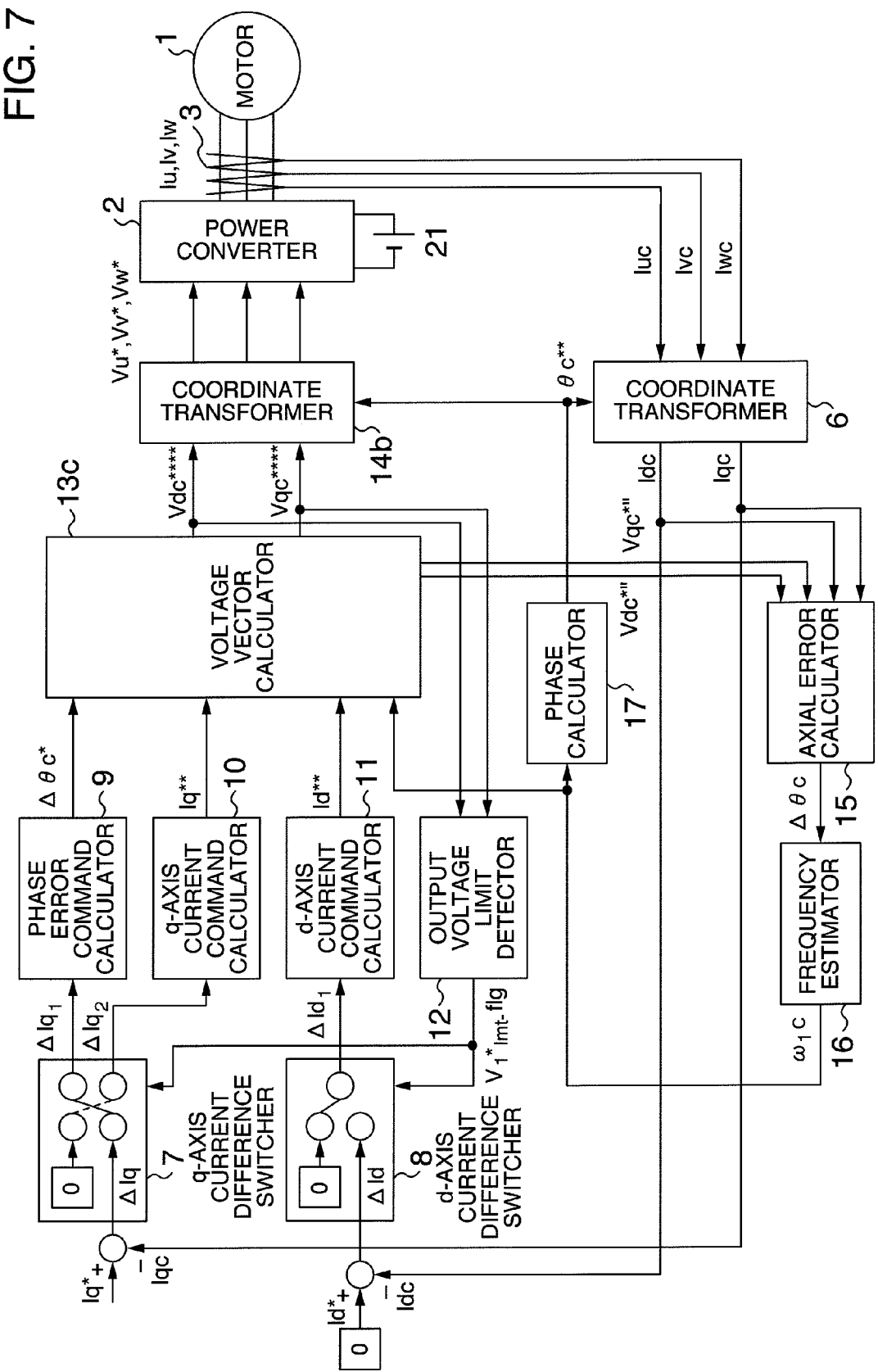
FIG. 7 schematically shows the overall structure of a vector control apparatus for a permanent magnet motor operated in the region of weak magnetic field, as a fourth embodiment of this invention.

FIG. 7 schematically shows a fourth embodiment of this invention.

In this embodiment, the weak field control is applied to a vector control apparatus without such an angular position detector as a resolver or an encoder.

In FIG. 7, the components denoted by reference numerals 1 through 3, 6 through 12, 14 and 21 are identical with those corresponding components shown in FIG. 1.

A voltage vector calculator 13c calculates the intermediate voltage command values Vdc*''' and Vqc*''' and the updated voltage command values Vdc** and Vqc according to the expression (10) given below by using the second d- and q-axis current command values Id and Iq**, the motor constants and the estimated frequency $\omega_1 c$.

$$\begin{pmatrix} Vdc^{*\prime\prime\prime} \\ Vqc^{*\prime\prime\prime} \end{pmatrix} = \begin{pmatrix} R^* & -\omega_{1c} \cdot Lq^* \\ +\omega_{1c} \cdot Ld^* & R^* \end{pmatrix} \cdot \begin{pmatrix} Id^{} \\ Iq^{} \end{pmatrix} + \begin{pmatrix} 0 \\ \omega_1 \cdot Ke^* \end{pmatrix} \quad (10)$$

$$\begin{pmatrix} Vdc^{**} \\ Vqc^{**} \end{pmatrix} = \begin{pmatrix} Vdc^{*\prime\prime\prime} \\ Vqc^{*\prime\prime\prime} \end{pmatrix} \cdot \begin{pmatrix} \cos\Delta\theta c^* & -\sin\Delta\theta c^* \\ \sin\Delta\theta c^* & \cos\Delta\theta c^* \end{pmatrix}$$

Reference numeral 14b indicates a coordinate transformer for delivering the three-phase AC voltage command values Vu*, Vv* and Vw* on the basis of the voltage command values Vdc** and Vqc and the phase command value θc.

Reference numeral 15 denotes an axial error calculator for estimating the axial error as the difference between the phase command value θc** and the value θ of the motor phase and delivering the quantity Δθc according to the expression (11) given below by using the voltage command values Vdc*''' and Vqc*''', the estimated frequency $\omega_1 c$, the detected current values Idc and Iqc, and the motor constants.

$$\Delta\theta c = \tan^{-1}\left[\frac{Vdc^{*\prime\prime} - R^* \cdot Idc - \omega_{1c} \cdot Lq^* \cdot Iqc}{Vqc^{*\prime\prime} - R^* \cdot Iqc + \omega_{1c} \cdot Lq^* \cdot Idc}\right] \quad (11)$$

Reference numeral 16 indicates a frequency estimator for calculating the estimated frequency $\omega_1 c$ in such a manner that the axial error $\Delta\theta c$ be reduced to "zero".

Reference numeral 17 denotes a phase calculator for integrating the estimated frequency $\omega_1 c$ and consequently obtaining the phase command value $\theta c^{**}$.

It is apparent that this control system without an angular position sensor operates in the same way as the systems described in the previous embodiments and can obtain the same effect.

Although this embodiment employs the system as shown in FIG. 1, wherein the voltage command values are corrected in the d-q coordinate system by using the phase error command value $\Delta\theta c^*$, it is also apparent that the same effect can be obtained even if the system as shown in FIG. 4 is employed, wherein the three-phase AC voltage command values are corrected.

Fifth Embodiment

In the first through fourth embodiments described above, the control system detects the three-phase AC currents Iu, Iv and Iw by using an expensive current detector 3. However, the same effect can be obtained with a control apparatus using an inexpensive current detector as described in this embodiment.

Figure 8:
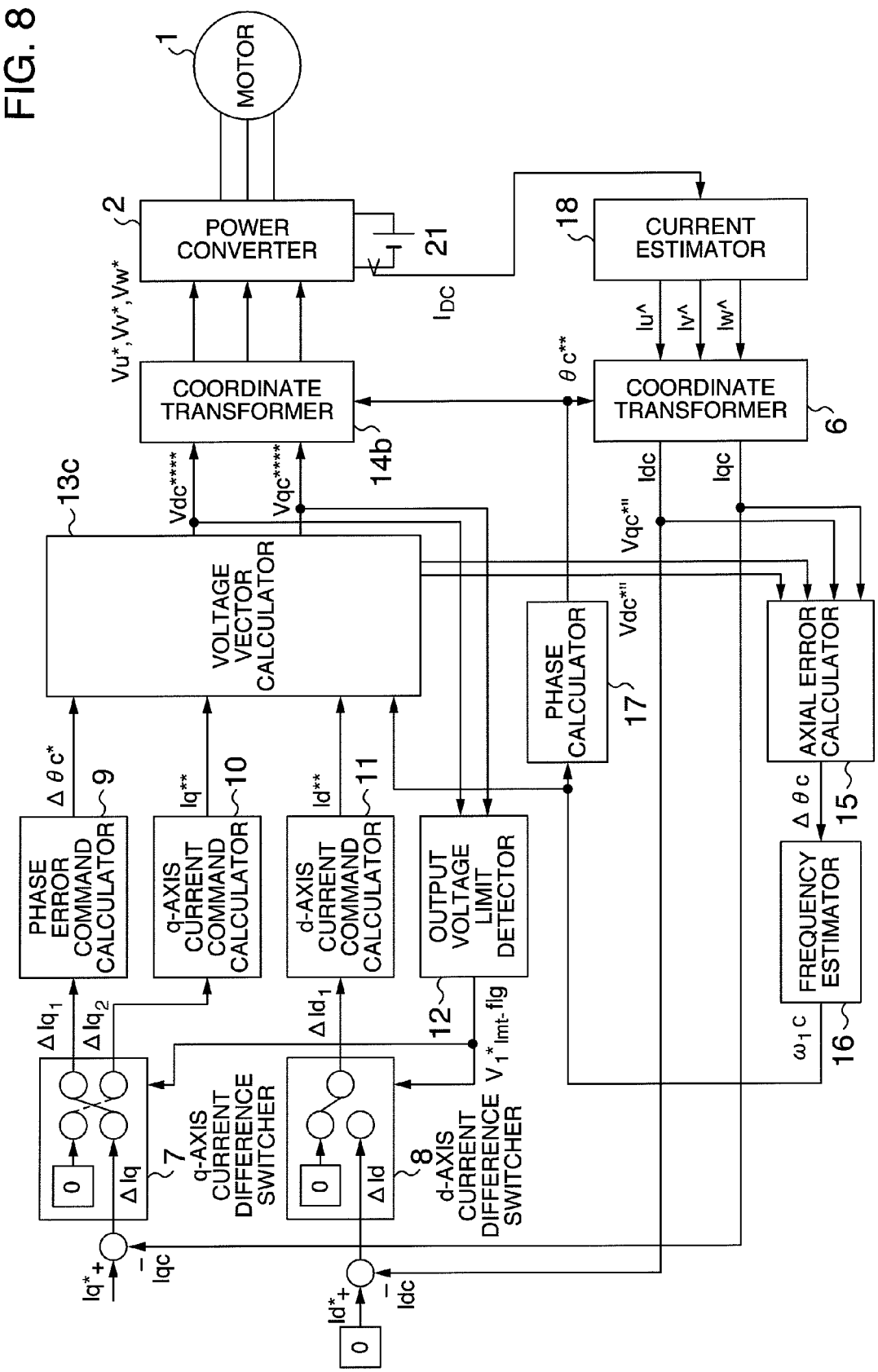
FIG. 8 schematically shows the overall structure of a vector control apparatus for a permanent magnet motor operated in the region of weak magnetic field, as a fifth embodiment of this invention.

FIG. 8 shows such an embodiment.

In FIG. 8, the components denoted by reference numerals 1, 2, 6 through 12, 13c, 14b through 16 and 21 are identical with those corresponding components shown in FIG. 7.

Reference numeral 18 indicates a current estimator for estimating the three-phase AC currents Iu, Iv and Iw flowing through the motor 1 from the DC current IDC flowing through the input bus of the power converter 2.

The coordinate transformer 6 calculates the detected values Idc and Iqc of the d- and q-axis currents by using the estimated current values Iu^, Iv^ and Iw^.

It is apparent that this embodiment without a current sensor operates in the same way and can obtain the same effect, as the previous embodiments since Id* and Iq* coincide with Idc and Iqc, respectively.

Although this embodiment employs the system as shown in FIG. 1, wherein the voltage command values are corrected in the d-q coordinate system by using the phase error command value $\Delta\theta c^*$, it is also apparent that the same effect can be obtained even if the system as shown in FIG. 4 is employed, wherein the three-phase AC voltage command values are corrected.

Sixth Embodiment

Figure 9:
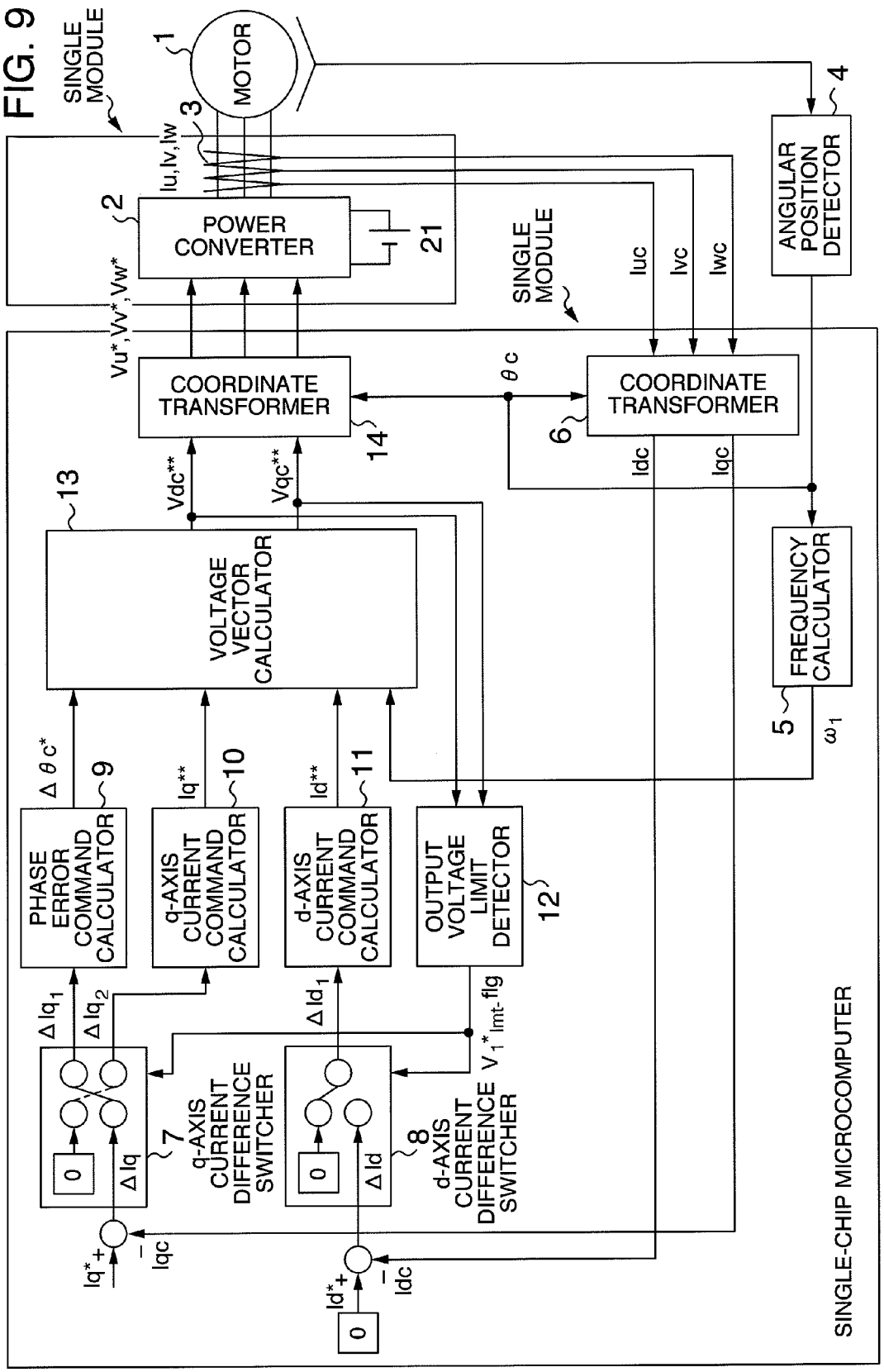
FIG. 9 shows a sixth embodiment of this invention wherein the vector control apparatus of this invention is embodied in a modular constitution.

FIG. 9 shows a further embodiment of this invention wherein the vector control apparatus of this invention is embodied in a modular constitution.

In this sixth embodiment of the invention, the vector control apparatus as the first embodiment described above is realized in a modular structure.

As shown within a rectangular box labeled "single-chip microcomputer" in FIG. 8, a frequency calculator 5, a coordinate transformer 6, a q-axis current difference switcher 7, a d-axis current difference switcher 8, a phase error command calculator 9, a q-axis current command calculator 10, a d-axis current command calculator 11, an output voltage limit detector 12, a voltage vector calculator 13 and a coordinate transformer 14 are integrated in the form of a single-chip microcomputer.

Further, the single-chip microcomputer and a power converter 2 are contained in a single module to be mounted on a single printed circuit board, as shown in FIG. 9. The term "module" used here means a "standardized structure unit" and consists of a separable combination of hardware and software. Moreover, although the module is preferably mounted on a single printed circuit board, it may also be separately mounted on more than one printed circuit board.

Furthermore, it may also be mounted separately on plural printed circuit boards contained in a single casing.

The other embodiments described above may also be realized in the same modular structure.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A vector control apparatus for a permanent magnet motor, which controls the output voltage command values of a power converter for driving the permanent magnet motor in accordance with the d- and q-axis current command values, the detected values of the d- and q-axis currents, the calculated frequency and the preset values of the motor constants, wherein
    when the values of the output voltages of the power converter are limited, the phase error command value represented by the difference between the angular position of the reference axis for control and the angular position of the motor magnetic flux axis is generated on the basis of the difference between the q-axis current command value and the d-axis current command value.

2. A vector control apparatus as claimed in claim 1, wherein the output voltage command values of the power converter are corrected depending on the phase error command value.

3. A vector control apparatus as claimed in claim 1, wherein
    the output voltage command values of the power converter are corrected by using the phase error command value and the d- and q-axis voltage command values.

4. A vector control apparatus as claimed in claim 1, wherein
    the reference axis for control is corrected by adding the phase error command value to the detected value of the angular position of the rotor of the permanent magnet motor so that the output voltage command values of the power converter are corrected.

5. A vector control apparatus as claimed in claim 1, wherein
    the output voltage command values of the power converter are calculated on the basis of the second d-axis current command value calculated from the first d-axis current command value and the detected value of the d-axis current, the second q-axis current command value calculated from the first q-axis current command value and the detected value of the q-axis current, the motor constants and the calculated frequency.

6. A vector control apparatus as claimed in claim 1, wherein
    the detected values of the d- and q- axis currents are calculated depending on the detected values of the currents flowing through the input bus of the power converter.

7. A vector control apparatus as claimed in claim 1, wherein the difference between the angular position of the reference axis for control and the angular position of the motor magnetic flux axis is calculated on the basis of the d- and q-axis voltage command values, the detected values of the d- and q-axis motor currents or the currents calculated depending on the detected values of the currents flowing through the input bus of the power converter, and the calculated frequency is so calculated as to reduce the difference nearly to zero.

8. A vector control apparatus for a permanent magnet motor, which controls the output voltage command values of a power converter for driving the permanent magnet motor in accordance with the sum of the current control output values calculated from first d- and q-axis current command values and the detected values of the d- and q-axis currents, and the value obtained through the calculation from second d- and q-axis current command values, calculated frequency value and the motor constants, wherein when the values of the output voltages of the power converter are limited, the phase error command value represented by the difference between the angular position of the reference axis for control and the angular position of the motor magnetic flux axis is generated on the basis of the difference between the first q-axis current command value and the detected value of the first q-axis current.

9. A vector control apparatus as claimed in claim 8, wherein the output voltage command values of the power converter are corrected depending on the phase error command value.

10. A vector control apparatus as claimed in claim 8, wherein the output voltage command values of the power converter are corrected by using the phase error command value and the second d- and q-axis voltage command values.

11. A vector control apparatus as claimed in claim 8, wherein the output voltage command values of the power converter are corrected by correcting the detected value of the angular position of the rotor of the permanent magnet motor depending on the phase error command value.

12. A vector control apparatus as claimed in claim 8, wherein the detected values of the d- and q-axis currents are calculated depending on the detected values of the currents flowing through the input bus of the power converter.

13. A vector control apparatus as claimed in claim 8, wherein the difference between the angular position of the reference axis for control and the angular position of the motor magnetic flux axis is calculated on the basis of the d- and q-axis voltage command values, the detected values of the d- and q-axis motor currents or the currents calculated depending on the detected values of the currents flowing through the input bus of the power converter, and the calculated frequency is so calculated as to reduce the difference nearly to zero.

14. A module comprising a power converter and a vector control apparatus for a permanent magnet motor, which controls the output voltage command values of a power converter for driving the permanent magnet motor in accordance with d- and q-axis current command values, the detected values of d- and q-axis currents, the calculated frequency value and the preset values of the motor constants, wherein when the values of the output voltages of the power converter are limited, the phase error command value represented by the difference between the angular position of the reference axis for control and the angular position of the motor magnetic flux axis is generated on the basis of the difference between the q-axis current command value and the detected value of the q-axis current.

* * * * *